United States Patent
Kim et al.

(10) Patent No.: US 9,552,038 B2
(45) Date of Patent: Jan. 24, 2017

(54) MONITORING AND MANAGING PROCESSOR ACTIVITY IN POWER SAVE MODE OF PORTABLE ELECTRONIC DEVICE

(71) Applicant: Samsung Electronics Co., Ltd., Gyeonggi-do (KR)

(72) Inventors: Minsu Kim, Busan (KR); Chihyun Cho, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 425 days.

(21) Appl. No.: 13/678,858

(22) Filed: Nov. 16, 2012

(65) Prior Publication Data

US 2014/0143568 A1  May 22, 2014

(51) Int. Cl.
G06F 1/32 (2006.01)
G06F 11/30 (2006.01)

(52) U.S. Cl.
CPC ........... *G06F 1/3206* (2013.01); *G06F 1/3215* (2013.01); *G06F 1/3265* (2013.01); *G06F 1/3287* (2013.01); *G06F 11/3003* (2013.01); *G06F 11/3062* (2013.01); *G06F 2201/865* (2013.01); *Y02B 60/1242* (2013.01); *Y02B 60/32* (2013.01)

(58) Field of Classification Search
CPC ........ G06F 1/3202; G06F 1/3231; G06F 1/26; G06F 1/206; G06F 1/3228
See application file for complete search history.

(56) References Cited

U.S. PATENT DOCUMENTS

| | | | |
|---|---|---|---|
| 8,769,624 B2* | 7/2014 | Cotterill | 726/4 |
| 2004/0187134 A1 | 9/2004 | Suzuki | |
| 2005/0114389 A1 | 5/2005 | Kamiya | |
| 2009/0305732 A1* | 12/2009 | Marcellino et al. | 455/466 |
| 2010/0107150 A1* | 4/2010 | Kamada et al. | 717/170 |
| 2011/0016455 A1* | 1/2011 | Perry et al. | 717/130 |
| 2011/0296416 A1* | 12/2011 | Kim | G06F 11/328 718/100 |
| 2012/0015695 A1* | 1/2012 | Hackborn et al. | 455/566 |
| 2012/0169608 A1* | 7/2012 | Forutanpour et al. | 345/173 |
| 2012/0173622 A1 | 7/2012 | Toledano et al. | |
| 2012/0216146 A1* | 8/2012 | Korkonen | 715/835 |
| 2012/0254634 A1* | 10/2012 | Chakra et al. | 713/300 |
| 2012/0260118 A1* | 10/2012 | Jiang et al. | 713/340 |

(Continued)

FOREIGN PATENT DOCUMENTS

KR  10-2012-0091551 A  8/2012

OTHER PUBLICATIONS

Iridaki, "[Guide] How-To Properly Evaluate Battery Life and Provide Useful Reports", May 29, 2012.

(Continued)

*Primary Examiner* — Zahid Choudhury
(74) *Attorney, Agent, or Firm* — Cha & Reiter, LLC

(57) ABSTRACT

An electronic device and a method operative therein monitor automatic wakeup events that occur during a power save mode. Wakeup events are monitored for respective applications executable within the electronic device. Applications with processing activity during the power save mode are then listed, on the basis of at least the monitored wakeup events. An indication of which apps are consuming battery power during the power save mode can then be obtained.

20 Claims, 7 Drawing Sheets

(56) References Cited

U.S. PATENT DOCUMENTS

2012/0272230 A1* 10/2012 Lee .............................. 717/173
2013/0219155 A1*  8/2013 Barrus et al. .................... 713/1
2014/0173319 A1*  6/2014 Zeng ............................ 713/340
2014/0195839 A1*  7/2014 Chueh et al. ................. 713/323
2014/0237279 A1*  8/2014 Muralidhar et al. .......... 713/323

OTHER PUBLICATIONS

Pathak et al., "Bootstrapping Energy Debugging on Smartphones: A First Look at Energy Bugs in Mobile Devices", In HotNets-X Proceedings of the 10th ACM Workshop on Hot Topics in Networks, Nov. 14-15, 2011, Cambridge, MA.

Pathak et al., "Where is the energy spent inside my app? Fine Grained Energy Accounting on Smartphones with Eprof", In EuroSys '12 Proceedings of the 7th ACM European Conference on Computer Systems, Apr. 10-13, 2012, Bern, Switzerland.

Falaki et al., "SystemSens: A Tool for Monitoring Usage in Smartphone Research Deployments", In MobiArch '11 Proceedings of the 6th International Workshop on MobiArch, Jun. 28, 2011, Bethesda, Maryland.

* cited by examiner

MONITORING AND MANAGING PROCESSOR ACTIVITY IN POWER SAVE MODE OF PORTABLE ELECTRONIC DEVICE

BACKGROUND

1. Technical Field

The present disclosure relates generally to portable electronic devices and more particularly, to battery power conservation in portable electronic devices.

2. Description of the Related Art

With present day smart phones and other portable (i.e., hand held) electronic devices, minimizing battery drainage is a key design consideration, as battery life is of paramount importance to consumers. To reduce battery drainage, most portable devices enter a power save mode following a predetermined time duration in which a user input is not detected at the device. During the power save mode, the display is turned off and processing activities of the central processing unit are minimized. Some devices have various stages of power save modes in which battery consumption is progressively reduced.

A typical smart phone in use today has tens or even hundreds of software applications, commonly called "apps", stored in the device's memory. Some of these apps are provided by the original equipment manufacturer (OEM). Others are downloaded by the user from external sources. An icon for each app is typically displayed on one of the device's home screens, allowing the user to rapidly launch it, whereby it runs on the device's processor and consumes battery power. Once a first app is launched and runs in the foreground by producing dominant images on the device's display, if the user switches operation to a second app, the first app may continue to perform low level background processing, such as periodically communicating with a server to receive updates. Further, some applications launch programs in the background or periodically run process or command in the background even when the terminal is in an idle or sleep mode, thus contributing to battery drainage.

SUMMARY

In exemplary embodiments, an electronic device and a method operative therein monitors automatic wakeup events that occur during a sleep (or idle) mode. Wakeup events are monitored for respective applications executable within the electronic device. Applications with processing activity during a sleep mode are then listed, on the basis of at least the monitored wakeup events.

An application determined to have the most frequent wakeups or use the most cumulative processor time during a predetermined time period of device operation in the background can be ranked at the top of a processing activity list. A ranking list or list of apps with processing activity can be then be displayed, allowing a user to discern which applications are consuming more processing power, and hence causing more battery drainage than is desired. A menu can then be generated which allows a user to take appropriate action, such as blocking automatic wakeups for a selected application, deleting the application altogether from the device memory, or removing the application from the ranking list.

In one implementation, ratios of automatic wakeups in the sleep mode to user-initiated wakeups are established for each application. The processing activity rankings are then based on these ratios. A high ratio for an application is an indication that a relatively high percentage of the processing activity for that application has been occurring automatically, i.e., as part of background processing without user interaction with the application. Applications exhibiting high ratios of this sort may be considered good candidates for having automatic wakeups blocked.

In an aspect, a portable electronic device includes a control unit configured to execute applications, monitor automatic wakeup events that occur in the background during a sleep mode for respective ones of the applications, and to rank applications for processing activity during the sleep mode, on the basis of at least the monitored wakeup events. A memory stores program instructions for the applications.

BRIEF DESCRIPTION OF THE DRAWINGS

The above and other aspects, features and advantages of the present technology will become more apparent from the following detailed description, taken in conjunction with the accompanying drawings in which like reference numerals indicate like elements or features, wherein.

DETAILED DESCRIPTION OF EXEMPLARY EMBODIMENTS

Figure 1:
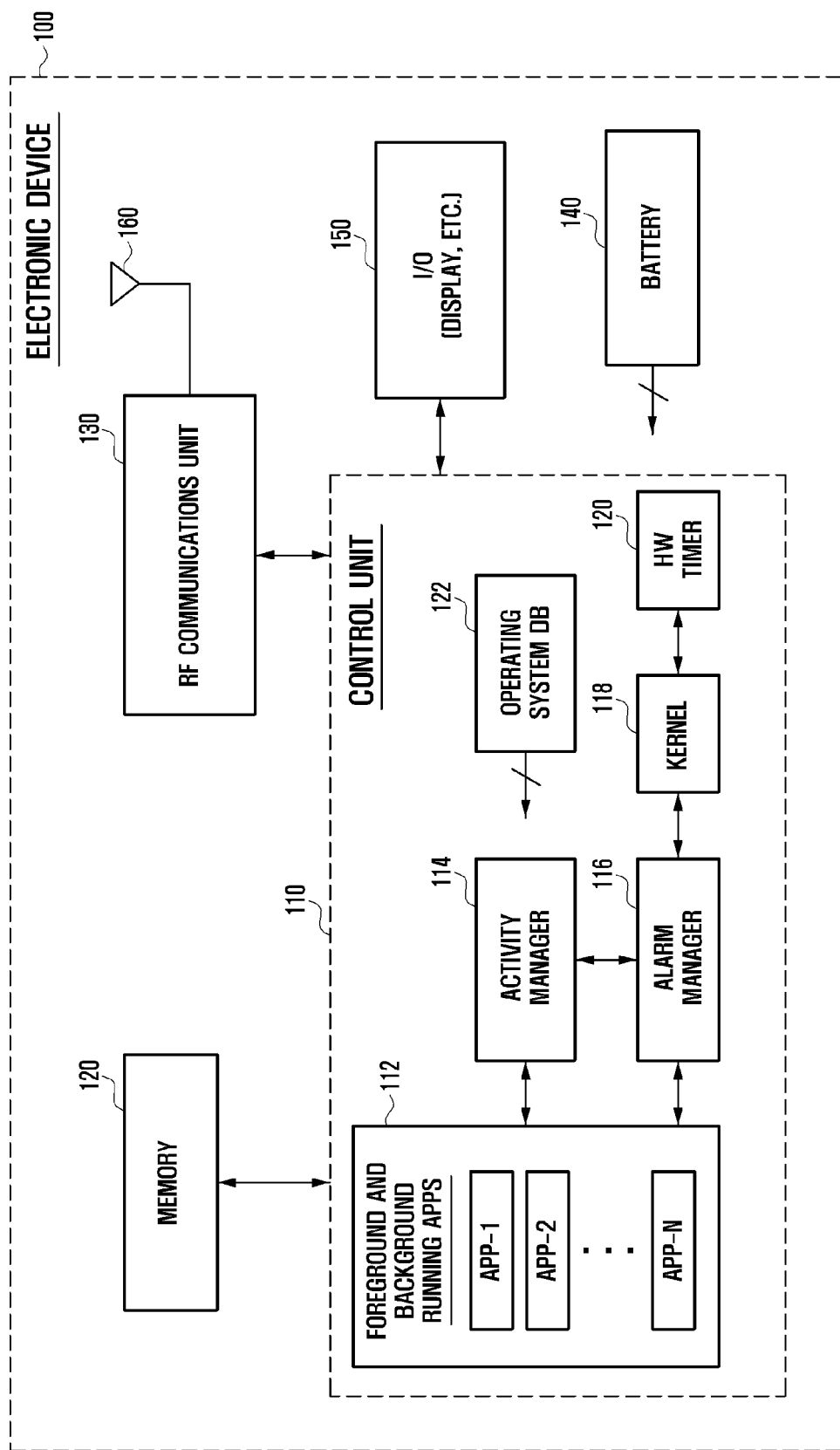
FIG. 1 is a functional block diagram of an exemplary embodiment of an electronic device that monitors and manages processing activity in accordance with the invention.

The following description, with reference to the accompanying drawings, is provided to assist in a comprehensive understanding of certain exemplary embodiments of the invention provided herein for illustrative purposes. The description includes various specific details to assist a person of ordinary skill the art with understanding the claimed invention, but these details are to be regarded as merely exemplary. Accordingly, those of ordinary skill in the art will recognize that various changes and modifications of the illustrative examples described herein can be made without departing from the spirit of the invention and the scope of the appended claims. For the purposes of simplicity and clarity, descriptions of well-known functions and constructions may be omitted when their inclusion may obscure appreciation of the subject matter of the claimed invention by a person or ordinary skill in the art.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural references unless the context clearly dictates otherwise. Thus, for example, a reference to "a component surface" includes reference to one or more of such surfaces.

By the term "substantially" it is typically meant that the recited characteristic, parameter, or value need not be achieved exactly, but that deviations or variations, including but in no way limited to, for example, tolerances, measurement error, measurement accuracy limitations and other factors known to persons of ordinary skill in the art, may occur in amounts that do not preclude the effect the characteristic was intended to provide.

In exemplary embodiments of the invention described hereinafter, an electronic device and a method operative therein monitors automatic wakeup events that occur in the background during a sleep (or idle) mode. Wakeup events are monitored for respective applications executable within the electronic device, e.g., apps that run on an application processor (AP) of the device. Applications are then ranked for processing activity during the sleep mode, on the basis of at least the monitored wakeup events. For instance, an application determined to have the most frequent wakeups or use the most cumulative processor time during a predetermined time period of device operation in the background can be ranked at the top of a processing activity list. A list of apps with processing activity, or a ranking list, can then be displayed, allowing a user to discern which applications are consuming more processing activity, and hence causing more battery drainage than is desired. A menu can then be generated which allows a user to take appropriate action, such as blocking automatic wakeups for a selected application, deleting the application altogether from the device memory, or removing the application from the ranking list.

In one implementation, ratios of automatic wakeups (including both periodic and non-periodic wakeups, if any) to user-initiated wakeups are established for each application. The processing activity rankings are then based on these ratios. A high ratio for an application is an indication that a relatively high percentage of the processing activity for that application has been occurring automatically, i.e., as part of background processing in the sleep mode without user interaction with the application. Applications exhibiting high ratios of this sort may be considered good candidates for having automatic wakeups blocked.

A portable electronic device in accordance with the invention can be a mobile terminal such a smart phone, a tablet computer, an electronic-book (e-book) reader, or any other electronic device that operates in a power save mode(s) to conserve battery power. A mobile terminal is a terminal or user equipment that can wirelessly access networks and can freely install and uninstall applications. Here, the networks include the Internet, mobile communication networks and other similar data and communication networks. A mobile terminal may wirelessly access the Internet via a mobile communication network using Wireless Application Protocol (WAP) or Wireless Internet Platform for Interoperability (WIPI), via a wireless Local Area Network (LAN) using access points, or via a portable Internet service such as Wireless Broadband (WiBro) or Worldwide Interoperability for Microwave Access (WiMax) enabling high-speed Internet access while in motion. A mobile communication network is composed of base stations and controllers controlling the same, may be a synchronous or asynchronous system, and may be any mobile network based on Code Division Multiple Access (CDMA), Global System for Mobile communications (GSM), third generation, enhanced third (3.5) generation, $4^{th}$ or $5^{th}$ generation wireless technology, or other suitable protocol.

FIG. 1 is a functional block diagram of an exemplary embodiment of an electronic device, 100, that monitors and manages processing activity in accordance with the invention. Electronic device 100 includes a control unit 110 having at least one processor for controlling the overall operations of device 100, and for executing applications (hereafter, also called "apps") 112 that interact with a user. As used herein, an app is any process that can output information or images on a display, output sound, cause movement such as vibration, perform a measurement, communicate with other processes or with external equipment, etc. As will be explained below, in some implementations, the user is provided with menu options to modify the behavior of selected apps. Therefore, the apps under particular consideration herein are apps that are non-essential to the basic operation of device 100. (It is preferable that essential processes, such as original operating system (OS) processes, are not blocked from performing their intended operations via user management described hereafter as it would be undesirable to disturb such processes.) Any app can be an OEM app originally provided as pre-installed software, or an app that was voluntarily downloaded by a user.

Electronic device 100 further includes a memory 120 that stores program instructions for applications retrieved by and executed within control unit 110, and stores a variety of data for various programs. An RF communications unit 130 performs necessary operations on transmit (coding, amplification, modulation, up-converting, etc.) and on receive (filtering, down-converting, demodulation, decoding, amplification, etc.) to perform data communication via antenna 160 with external base stations, access nodes, or other computing devices. An input/output (I/O) section 150 is provided for interaction with the user, and may include a display such as a touch screen, a keyboard (virtual and/or real), function keys or buttons, a speaker, microphone, and any other suitable I/O means. A rechargeable battery 140 provides electrical power to the various components of device 100. Battery life of battery 140 (i.e., the length of time that the device being powered can operate on a single charge of the battery) may be improved by embodiments described herein, as processing activity causing battery drainage is selectively reduced.

Control unit 110 includes one or more processors within which a plurality of apps 112 run. Any one of apps APP-1, APP-2, . . . APP-N can run in the foreground, typically resulting in images generated by the app dominating the display of device 100. The foreground running app is typically the result of a current user selection of that app for execution. While one app runs in the foreground, another app may run in the background, performing operations such as communicating with an external server to retrieve user data or to retrieve software updates for the application itself. For instance, an email app typically runs in the background while another app runs in the foreground, by periodically communicating with a mail server to check for the latest email. While the apps 112 are shown as part of control unit 110, it is understood by one skilled in the art that when any app APP-j is not being actively executed such as running in the foreground, it may be in a state of suspension in between background operations. In the suspended state, the app may be considered to reside in memory 120 where the latest data corresponding to the suspended state is stored in correspondence with the program code thereof.

Control unit 110 also controls device 100 to enter a power save mode (interchangeably referred to herein as a sleep mode). In the sleep mode, the device's display can be turned off to conserve power, and the control unit's application processor (AP) can be suspended. When the AP is suspended, any applications currently running, whether in the foreground or background, are suspended until they are awakened, as discussed below.

The sleep mode can be automatically initiated following a predetermined time duration in which no user interaction is detected by device 100. During the sleep mode, device 100 continues to perform periodic background communication operations necessary for device 100 to be communication ready. Furthermore, with predetermined arrangement therefor, any app can be automatically and periodically awakened in the sleep mode (unless blocked as discussed later) to retrieve or transmit user data or software updates. Control unit 110 further includes an activity manager 114, an alarm manager 116, kernel 118 and hardware (HW) timer 120, which together function to monitor and manage processing activity in the sleep mode as described further hereafter. An operating system database (DB) 122 can be utilized as an alternative processing entity to the activity manager 114 in some implementations discussed later.

Figure 2:
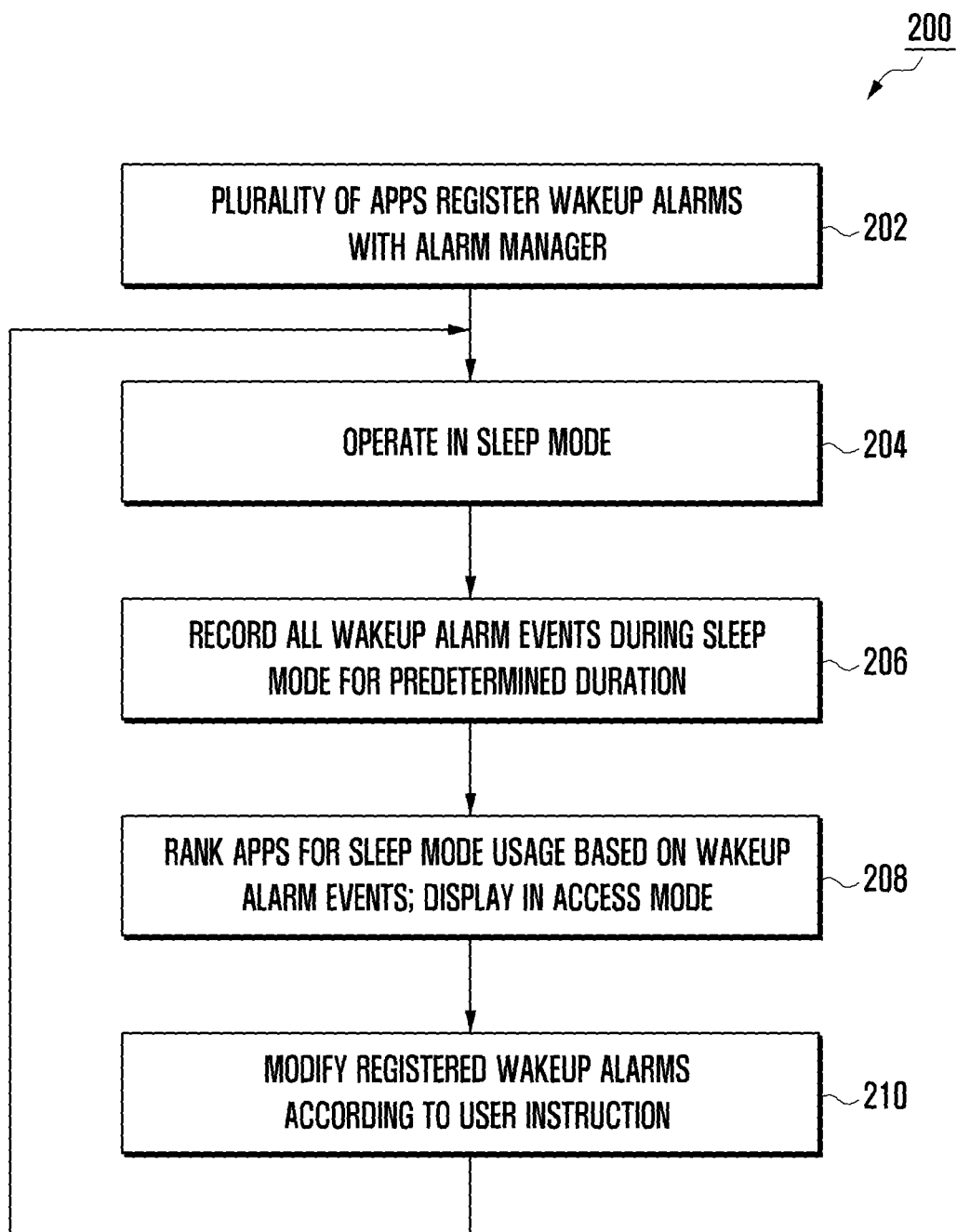
FIG. 2 is a flow chart illustrating an exemplary method that may be performed in the electronic device of FIG. 1.

FIG. 2 is a flow chart illustrating an exemplary method 200 that may be performed in the electronic device 100 of FIG. 1. During active mode operation of device 100, a plurality of apps 112 each register wakeup alarms with the alarm manager 116 (step 202). When an app such as APP-2 registers a wakeup alarm, the app requests to be "awakened" at a point of time in the future, or on a periodic basis, such that the app can be run in the future to perform a predetermined operation. When an alarm is registered for an app, it is retained by the system even if the device 100 enters and remains in sleep mode.

At (204), the device 100 enters sleep mode, which, as indicated above, can occur automatically after a predetermined time duration during which no user inputs are received. If device 100 is equipped with a soft or hard key to allow sleep mode to be entered manually, sleep mode is initiated upon detecting a user input via the key. During sleep mode, the application processor (AP) which runs all apps, becomes suspended, until it is awakened by a subsequent alarm trigger stemming from a registered alarm, or until a user input is received in the I/O section 150 (e.g., the user touches a touchscreen of I/O 150).

At (206), all wakeup events that occur during the sleep mode are recorded by the activity manager 114 (or the operating system DB in alternative implementation), and the events are tabulated for a predetermined time duration. The predetermined time duration can be established in a number of ways, and can be set by default or via a selection in a user settings menu. For instance, it may be desirable for a user or monitoring program to know how many times each app was awakened over the last X days or hours, regardless of the type of operation, e.g., active mode, sleep mode, or other type of power saving mode. Alternatively or additionally, the number of awakening times for each app over the last X days or hours only during sleep modes may be determined.

Next, apps are ranked for sleep mode usage based on the wakeup alarm events, and a list of the rankings is displayed in a user access mode (208) such as a menu mode. In this manner, the user can identify which apps are being awakened the most frequently during sleep modes and thus which apps are draining the battery 140 the most during sleep modes. Examples of ranking methods are detailed further below. At (210), wakeup alarms are modified according to a user instruction. In exemplary menu options described later (see FIG. 7), a user may be given an option to block wakeup requests for a selected app, to delete an app, or to simply remove an app from the ranking list.

Figure 3:
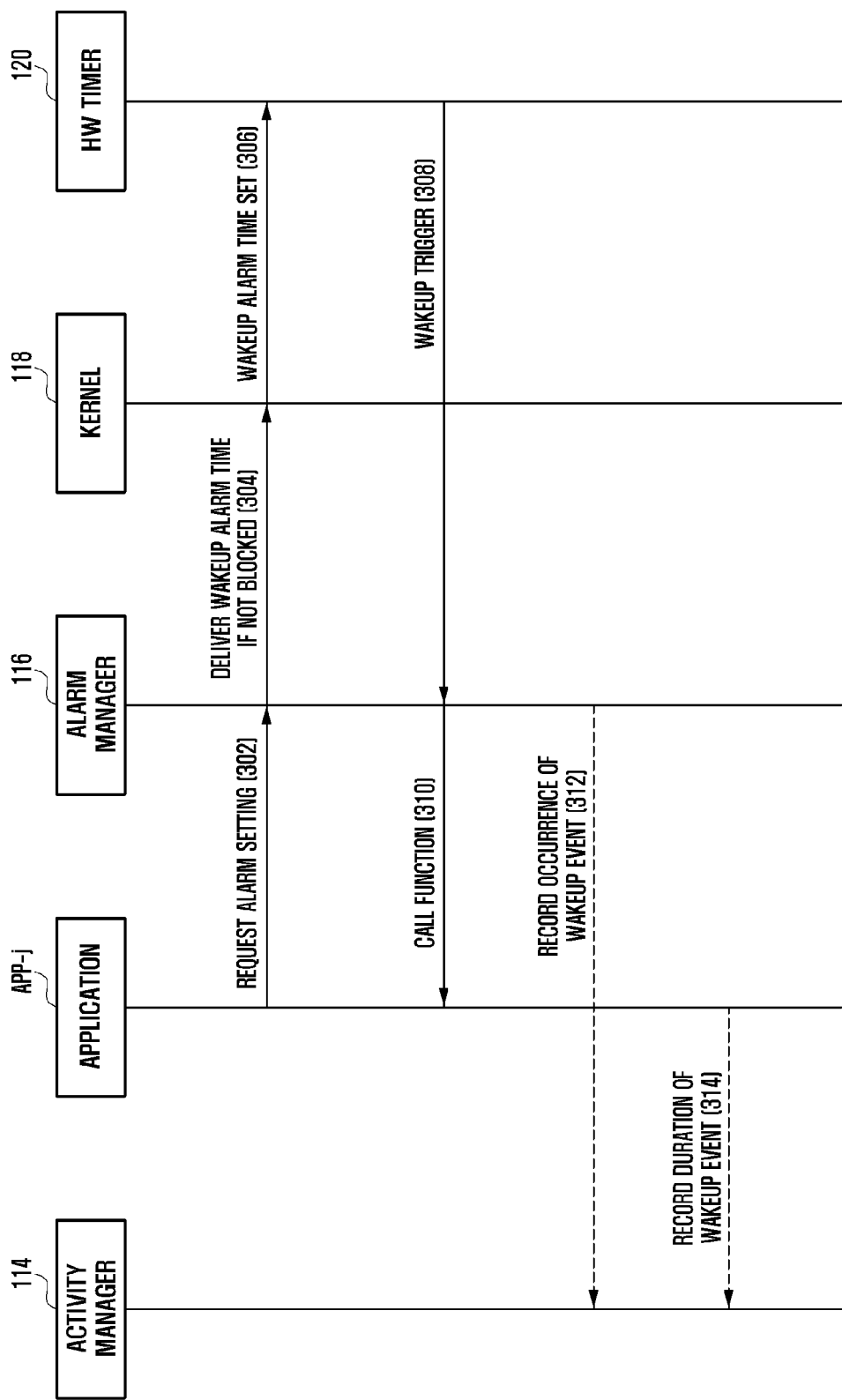
FIG. 3 illustrates a method operative within an electronic device by which wakeup alarms can be registered and wakeup events recorded in accordance with implementations of the invention.
Figure 7:
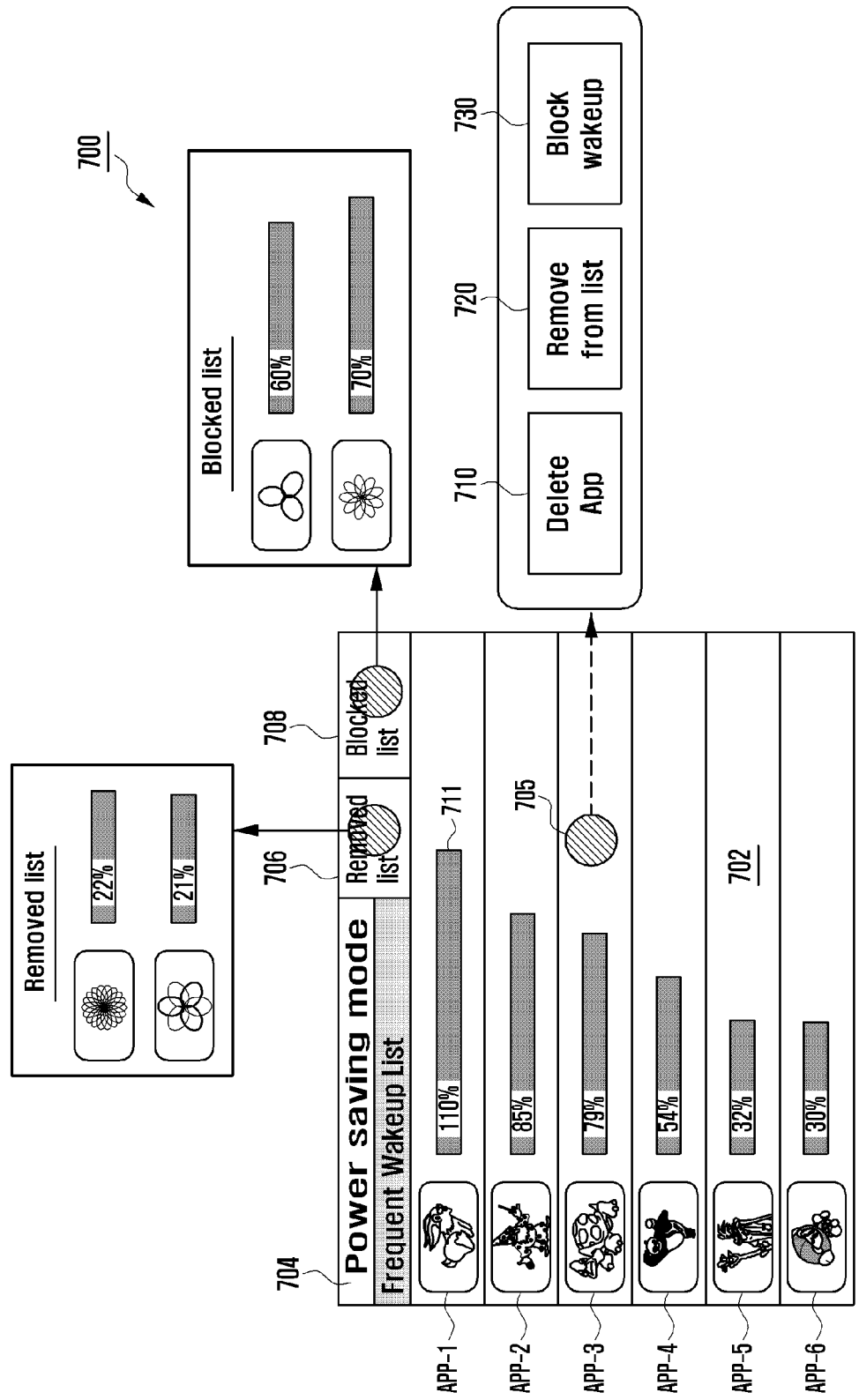
FIG. 7 is an example display screen of a menu which enables processing activity management for apps with registered alarms in accordance with an embodiment.

FIG. 3 illustrates a method operative within device 100 by which wakeup alarms can be registered and wakeup events recorded in accordance with implementations of the invention. In an active mode of device 100 (i.e., a non-sleep mode), a given application APP-j which is currently operating in the foreground or background can send a request for an alarm setting (registration) to alarm manager 116, as indicated at (302). This request can be in the form of a wakeup alarm time for a specific time in the future. In this case, an additional request instruction can be included for subsequent wakeups at a specified periodic time interval beginning from the specific time. Alternatively, the request can be for a specified periodic wakeup without a specific start time, such that the time of the first wakeup could be determined by the system. The alarm manager 116 then delivers the requested wakeup alarm time to the kernel 118 if the particular app that made the request is not currently blocked from registering requests. As indicated earlier, a user can block selected apps from registering requests in an options menu presented on the device 100 display, an example of which is shown in FIG. 7. At (306), kernel 118 then sets the HW timer in accordance with any non-blocked request by an app.

When a wakeup time arrives for the app, HW timer 120 generates a wakeup trigger corresponding to the app, which is delivered to alarm manager 116 via the kernel 118 (308). Alarm manager 116 responds by calling a function of the application to wake it up (310). At the same time, alarm manager 116 records (312) the wakeup event to an alarm count block (part of activity manager 114 in this example) which counts every wakeup event for each app of the apps 112. In addition, the activity manager 114 determines the running time of the app for each wakeup event; the running times are also stored by the alarm count block (314). In this manner, wakeup statistics are generated for each app and compared with those of other apps to establish rankings, which are displayable in a rankings list for app management by the user.

Ranking of apps for processing activity during the sleep mode is an indirect way to rank apps for excessive battery usage. Such rankings can be established in several ways.

In one implementation of a ranking method, just the raw number of automatic wakeup events for each app (i.e., a wakeup event due to a registered alarm) occurring in sleep modes is counted over a predetermined period of time, such as X days or hours. The app with the most wakeup events is then considered to use the most processing power and is placed at the top of the ranking list for processing activity. Note that an "active mode wakeup" for a particular app can occur during the active mode when that app is not running in the foreground, but this type of wakeup event is not counted in the exemplary embodiment. In other words, while a first app is running in the foreground and a second app is essentially suspended without any processor usage, a wakeup alarm that was set previously can go off, whereby the second app performs its intended operations for that wakeup event as background processing while the first app continues to operate in the foreground. In other embodiments (not further described herein), such active mode wakeups may be considered.

In another ranking method, the cumulative run time due to automatic wakeup events for each app over the predetermined time duration is determined and used as the primary metric for ranking.

In another ranking method, a hybrid of the number of wakeup events and cumulative run time is considered. For example, it may be considered that a wakeup event expends a minimum amount of energy due to processing activity, even if the run time for that wakeup event is negligible. Therefore, a total processing activity measure may be determined with a hybrid approach by (k×N)+RT, where N is the number of wakeup events, k is predetermined constant considering a minimum amount of energy expended for each wakeup event, and RT is the cumulative run time for all wakeup events.

A ranking method according to still another embodiment is based on a ratio "C" of:

A: number of wakeup events over a predetermined time duration that occur automatically in the sleep mode, to B: number of wakeup events over the predetermined time duration that occur as a result of user executions for the app under consideration.

That is, $$C=A/B \qquad \text{eqn. (1).}$$

At least four cases are possible for A/B, i.e.:
1. ALARM_CNT/RUN_CNT
2. ALARM_CNT/RUN_TIME
3. ALARM_TIME/RUN_CNT
4. ALARM_TIME/RUN_TIME Here, ALARM_TIME is cumulative wakeup lasting time in sleep state.

For example, if a first wakeup lasts 3 sec, a second wakeup lasts for 2 sec during the predetermined time, the ALARM_TIME is 5 sec and the ALARM_CNT is 2. RUN CNT denotes the number of times the user initiated the application during the predetermined duration. RUN TIME refers to the cumulative running time due to user initiated activations of the app over the relevant time period.

Thus, the ratio C for a given application provides a measure of the percentage of the cumulative processing time for that application that is attributed to the automatic wakeup operations as compared to that attributed to the active operations initiated by the user. Consequently, a high ratio C for an app is an indication that a relatively high percentage of the processing activity for that app has been occurring automatically, i.e., as part of background processing without user interaction with the app. Apps exhibiting high ratios of this sort may be considered good candidates for having automatic wakeups blocked.

A simple example of determining a ranking based on the ratio C is illustrated in Table 1. In the example, automatic wakeups and user-initiated executions are counted for each of a scheduling app, a clock alarm app, an email app and a weather app. (A user can set a certain time for an alarm in the schedule application or e.g., for morning call time in the clock alarm application. Even though the system is in a sleep state, the alarm works by the registered wakeup when the set time is reached. Email and weather applications usually synchronize with a server periodically whereas alarm of the scheduling and clock alarm application usually operate only one time that the user set.) The ratio C is lowest for the scheduling app and highest for the email app. Hence the user might consider that the processing activity for the email app during the sleep mode is excessive. The user may then decide to make an adjustment such as blocking wakeups for the email app or lengthening the cycle for which the email app accesses a mail server in another settings menu.

TABLE 1

| Wakeup type | Application | # of wakeups [A] | # of Executions [B] | Ratio [C] |
| --- | --- | --- | --- | --- |
| Non-periodic | Scheduling | 5 | 12 | 42% |
| Non-periodic | Clock alarm | 8 | 10 | 80% |
| Periodic | Email | 25 | 4 | 625% |
| Periodic | Weather | 32 | 15 | 213% |

Figure 4:
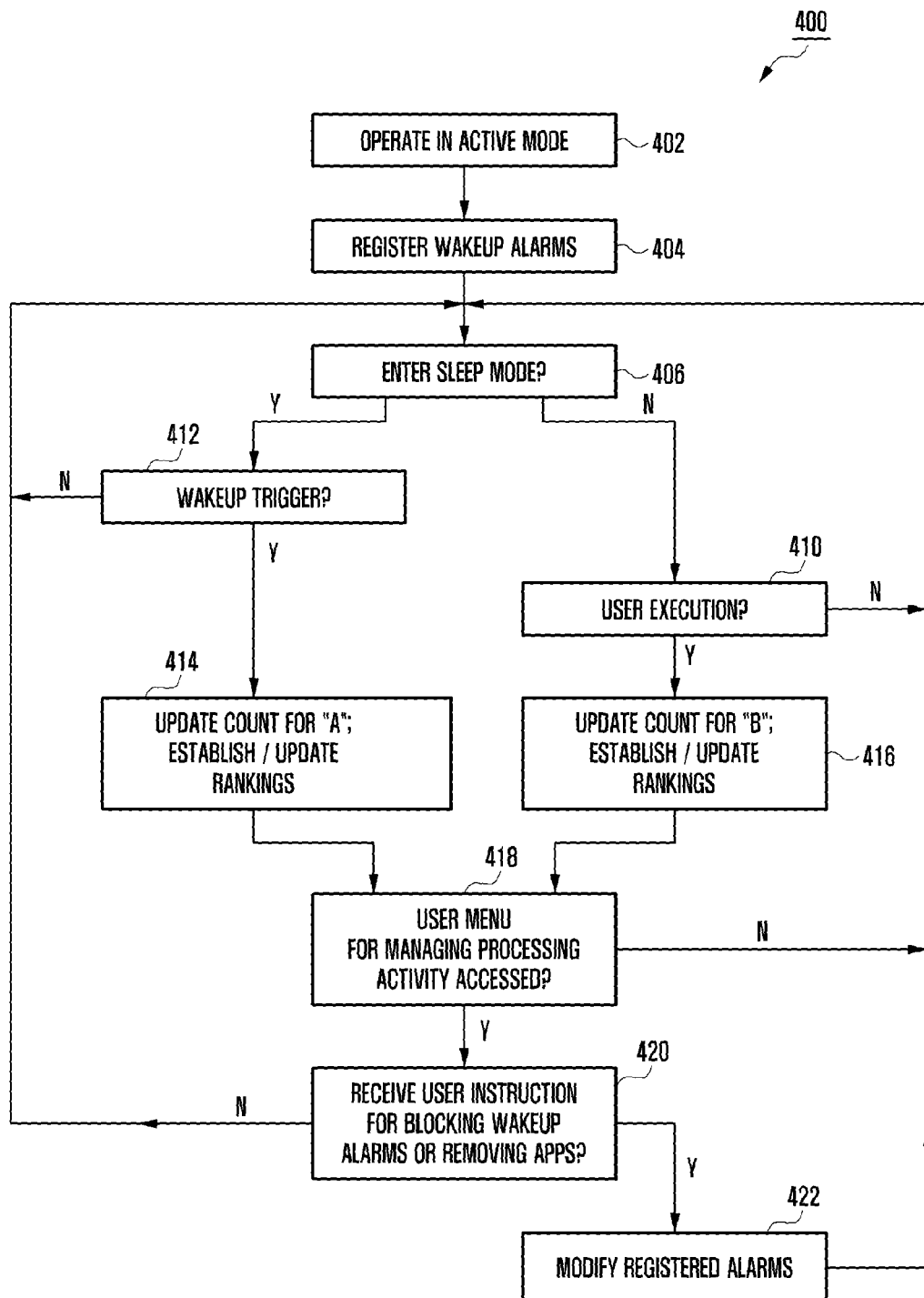
FIG. 4 is a flow chart illustrating another exemplary method that may be performed in the electronic device of FIG. 1.

FIG. 4 is a flow chart illustrating an example method, 400, that may be performed in the electronic device of FIG. 1. In this example, wakeup events for apps are monitored in a sleep mode and user executions are also monitored, whereby rankings may be based on the ratio C indicating percentage of processing activity "A" due to automatic wakeup events to processing activity "B" due to user interactions for each app under consideration.

The device 100 is operated in the active mode at 402. Wakeup alarms are then registered for respective apps at 404 in the manner described above. If a sleep mode is entered at 406, the application processor (AP) of control unit 110 is suspended such that no apps are run; and the alarm manager 116 then ascertains at 412 whether a wakeup trigger for any app has been received from the HW timer 120. If not, the device remains in the sleep mode. If yes, then at 414, the wakeup count "A" for the relevant app is updated, and processing activity rankings are established or updated in accordance with the additional "A" count data. That is, the "C" count for the app is updated or in the process of being developed. (An initial predetermined time duration for generating sufficient counts is necessary to establish an initial ranking for the various apps.)

If the sleep mode is not entered at 406, then if a user execution for an app is detected at 410, then the corresponding count "B" for user executions of that app is updated at 416, such that the ratio "C" can be updated.

With the ratio C updated at 414 or 416, the process determines whether a user menu for managing processing activity is accessed at 418. If no, the process returns to 406. If yes, it is determined at 420 whether a user instruction is received for blocking wakeup alarms of removing apps. If no, the flow returns to 406. If yes, the registered alarms are modified accordingly at 422, and the flow then returns to 406.

Figure 5:
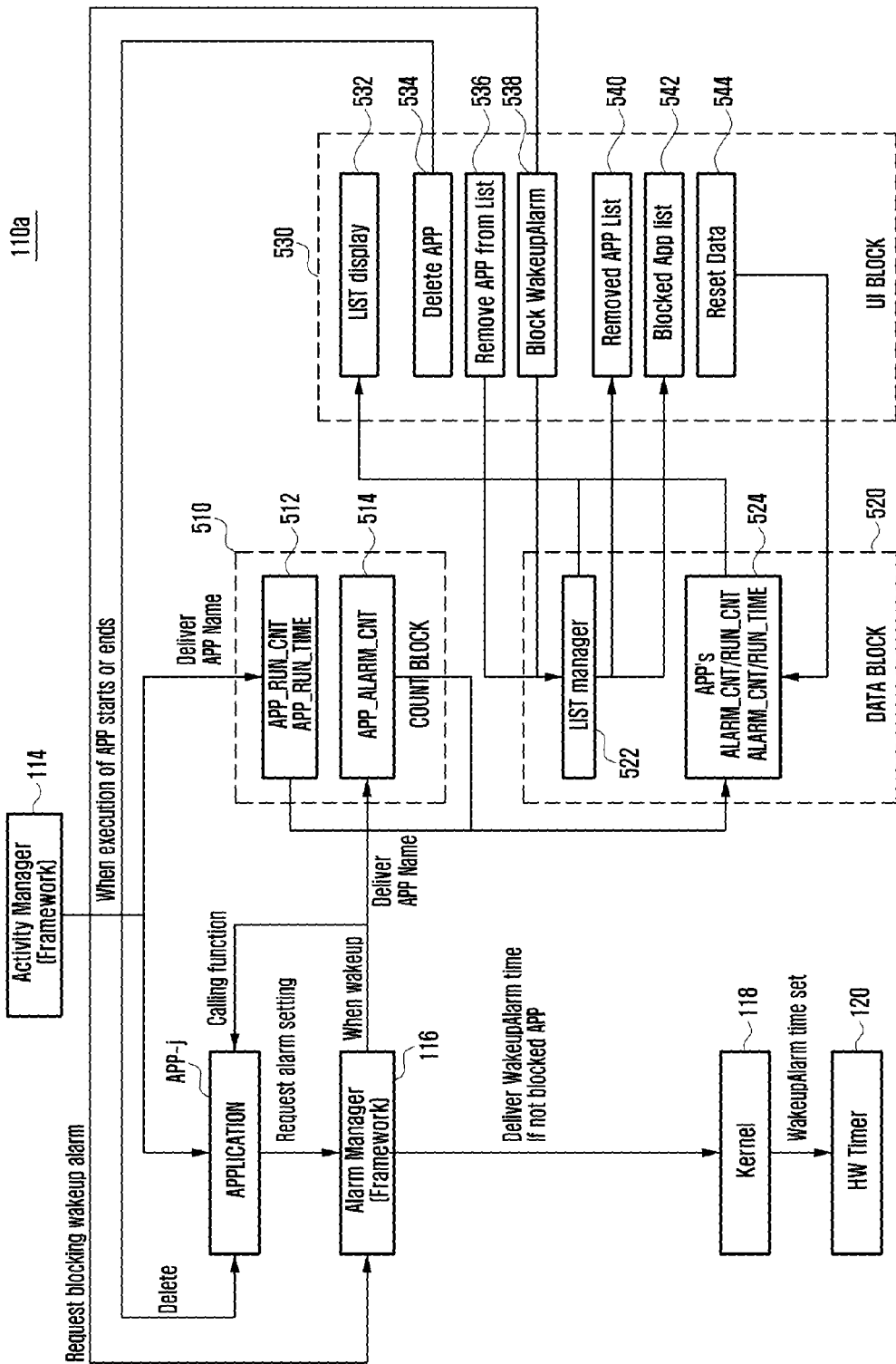
FIG. 5 is a functional block diagram of processing modules within an example control unit of the exemplary electronic device.

FIG. 5 is a functional block diagram of processing modules within an embodiment 110a of the control unit 110 of electronic device 100. Control unit 110a includes alarm manager 116, activity manager 114, kernel 118, HW timer 120, and a representative application APP-j of the foreground/background running apps 112, all of which have been described above in connection with FIGS. 1-4. Control unit 110a further includes an alarm count block 510, a data block 520 and a User Interface (UI) block 530.

As described above, any given app APP-j of apps 112 registers a wakeup alarm with alarm manager 116 (to perform a predefined processing operation) to request wakeup at a future time. That is, a future wakeup event is expected to be performed for APP-j at a time in which the device 100 is either in a sleep mode or in the active mode running a different app in the foreground. The wakeup alarm time is delivered to HW timer 120, and when the wakeup occurs, the app APP-j is called to wake it up and begin its predefined processing operation. In conjunction with the wakeup call, alarm manager 116 delivers the APP name to the alarm count block 510. Alarm count block 510 counts every application's wakeup events and stores the running time of the application using a received start and end time of the processing activity for each wakeup event from the activity manager 114. To this end, alarm count block 510 includes an APP_ALARM_CNT processing module 514 to update wakeup counts (alarm counts) for respective apps. An updated count for APP-j is delivered to a memory region 524 within data block 520 (data block 520 can also be considered part of memory 120) which stores the alarm counts for the respective apps. Alarm count block 510 further includes an App_Run_CNT processing module to monitor run times corresponding to the wakeup events, to eventually arrive at a cumulative run time over a predetermined time duration as described earlier. Thereby, a processing activity ranking can be derived for the various apps that have registered wakeup alarms.

Data block 520 stores wakeup statistics calculated in one of the methods described above in connection with FIG. 2 or 4. That is, processing activity for apps during the sleep mode can be characterized either by the number of wakeup events or cumulative running times associated with the wakeup events over a predetermined time duration; or, by the ratio C described above.

Referring temporarily to FIG. 7, an example display screen 700 of a menu which enables processing activity management for apps with registered alarms in accordance with an embodiment is shown. Display screen 700 includes a main area 702 displaying identifiable icons for a predetermined number of apps (APP-1 to APP-6 in the example). The apps displayed are those in a most frequent wakeup list established for all the apps 112. A metric of processing activity during power save mode is displayed alongside each app APP-1 to APP-6. In the example, the ratio C is used to characterize the amount of power save mode processing activity for each app as the percentage defined by A/B (number of automatic wakeup events to the number of user initiated executions). In other embodiments, the metric can be based just on the number of automatic wakeups, the running times for those wakeups, or a combination thereof as described earlier. The displayed metric can be augmented by a length of a bar 711 for rapid visual perception of the relative processing activities.

Any displayed app icon such as that for APP-3 can be selected by the user for processing activity management, as indicated by touch event 705 occurring on a touch screen display of device 100. When an app is so selected, a pop-up menu or the like is generated, prompting a user to input a command for one of several menu options. Selecting a "block wakeup" option 730 results in all future automatic wakeup alarms being blocked for the selected app APP-3, thereby blocking processing operations for that app in the power save mode. A "delete app" menu option 710 allows the user to delete the selected app APP-3 entirely from the device memory 120. A "remove from list" menu option allows the user to remove the icon from the frequent wakeup display list on main screen 702, whereby another app is typically displayed in its place. Main screen 702 includes a power saving mode icon 704 allowing display of the apps in the frequent wakeup list, a removed list icon 706 allowing the user to view and manage those apps already removed from the frequent wakeup list; and a blocked list icon 708 allowing the user to display a list of the blocked apps. A blocked app may also be allowed to become unblocked with suitable user command (not shown).

Returning to FIG. 5, the UI processing block 530 is configured to generate the user interface display for processing activity management such as that shown and described for FIG. 7. UI block 530 also provides a reset function to initialize the wakeup statistics. To this end, UI processing block 530 includes a LIST display module 532, a delete App processing module 534, a Remove App from list processing module 536; a Block WakeupAlarm processing module 538; a Removed App list processing module 540; a blocked App list processing module 542; and a Reset Data processing module 544. Data block 520 further includes a List manage data structure 522 to store the various lists which are accessed as needed by the associated processing modules 536 to 544.

Figure 6:
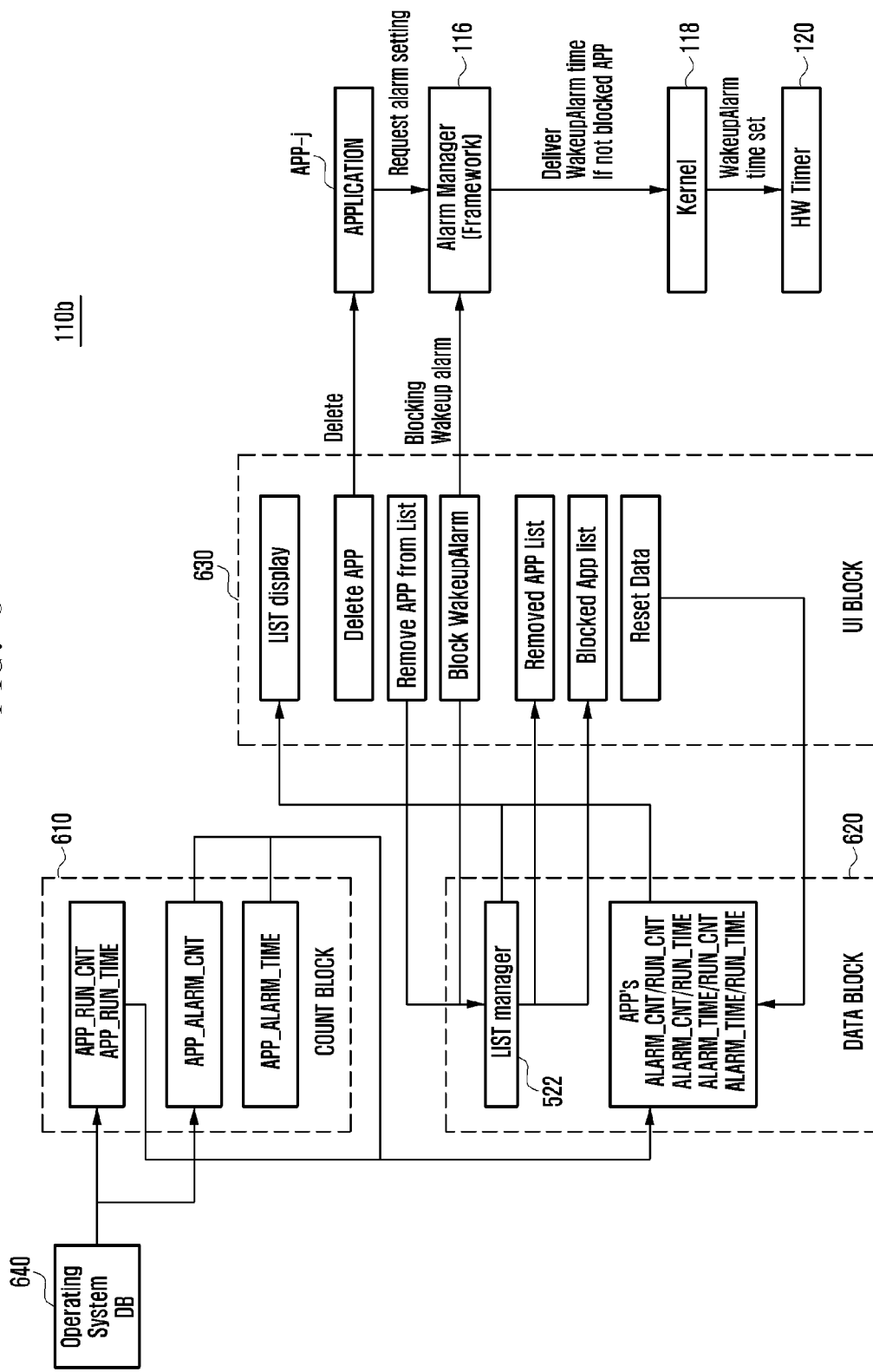
FIG. 6 is a functional block diagram of processing modules within another example control unit of the exemplary electronic device.

FIG. 6 is a functional block diagram of processing modules within an embodiment 110b of the control unit 110 of electronic device 100. Control unit 110b includes an alarm count block 610, a data block 620 and a UI block 630 which can be the same or substantially similar to count block 510, data block 520 and UI block 530, respectfully, of FIG. 5. Moreover, alarm manager 116, kernel 118, HW timer 120 and representative application APP-j are the same as described above. Control unit 110b differs from control unit 110a by substituting an Operating System database (DB) 640, such as the Android (trademark of Google corporation) DB, for the activity manager 114. The Operating System DB 640 manages the data block 620 including the number of application executions (i.e., the above-described parameter "B"), the application running times and the number of automatic wakeup alarms (i.e., the parameter "A" described above). The alarm count block 610 receives the information from the Operating System DB 640 and operates in the same manner as in the embodiment of FIG. 5.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the exemplary embodiments described herein have been particularly shown and described with reference to exemplary embodiments thereof, it will be understood by those of ordinary skill in the art that various changes in form and details may be made therein without departing from the spirit and scope of the invention as defined by the following claims and their equivalents.

What is claimed is:

1. A method operative in a portable electronic device, comprising:

obtaining information indicative of an amount of background power usage for respective applications consuming power within the electronic device, the information comprising a ratio of automatic wakeups of a given application due to registered alarms, to user initiated executions of the given application occurring during a predetermined time period of device operation;

determining based on the obtained information, a first group of applications, each of which consumes higher power in a background than that consumed by each application in a second group of applications among the applications; and displaying a list, which includes the first group of applications and excludes the second group of applications, including information indicative of the amount of background power usage for respective applications of the first group of applications.

2. The method of claim 1, further comprising registering, for each application requesting at least one wakeup during a power save mode operation, at least one wakeup alarm with an alarm manager.

3. The method of claim 1, wherein the obtained information is obtained during a power save mode, which is a mode in which a display of the electronic device is turned off, and the method further comprising automatically initiating the power save mode following a predefined time in which no user interaction with the device is detected.

4. The method of claim 1, further comprising displaying at least a first menu option to enable blocking automatic wakeups for a selected application listed on the first group of applications.

5. The method of claim 4, further comprising displaying a second menu option to delete the selected application from memory of the electronic device, and a third menu option to remove the selected application from the list.

6. The method of claim 3, wherein the portable electronic device is a mobile communication terminal, and the power save mode is a communication ready sleep mode in which a display of the terminal is turned off but communication control signals from a base station are periodically received to render the terminal communication ready.

7. A portable electronic device comprising:
a display;
a control unit configured to:
obtain information indicative of an amount of background power usage for respective applications consuming power within the electronic device, the information comprising a ratio of automatic wakeups of a given application due to registered alarms, to user initiated executions of the given application occurring during a predetermined time period of device operation, determine based on the obtained information, a first group of applications, each of which consumes higher power in a background than that consumed by each application in a second group of applications among the applications, and present via the display a list of the first group of applications including information indicative of the amount of background power usage for respective applications of the first group of applications, and a menu option to enable removal of a selected one of the applications in the first group from the list; and a memory within which program instructions for the applications are stored.

8. The portable electronic device of claim 7, wherein at least another menu option is displayed to enable blocking automatic wakeups for a selected application listed on the first group of applications.

9. The portable electronic device of claim 8, wherein a further menu option is displayed to enable deletion of the selected application from the memory.

10. The portable electronic device of claim 7, wherein the control unit comprises:
an alarm manager to handle alarm registration requests by applications;
a hardware timer to store registered alarms and forward alarm triggers upon the occurrence of wakeup events to the alarm manager; and
an activity manager to count wakeup events and run times of respective applications during a predetermined time duration to calculate relative background power consumption of applications.

11. A portable electronic device comprising:
a display;
a memory within which applications are stored;
a control unit, operatively coupled to the memory, and configured to:
obtain information indicative of an amount of background power usage for respective applications consuming power within the electronic device;
based on the obtained information, present via the display visual information identifying a first application as an application which consumes more power in a background than that consumed by a second application of the applications;
present via the display a user selectable icon permitting a user to block a selected application after the display is turned off; and
block the selected application after the display is turned off in response to a selection of the user selectable icon.

12. The portable electronic device of claim 11, wherein the control unit is further configured to present via the display visual information pertaining to background power usage for a given application of the applications.

13. A portable electronic device comprising:
a display;
a memory within which applications are stored;
a control unit, operatively coupled to the memory, and configured to:
obtain information indicative of an amount of background power usage for respective applications consuming power within the electronic device;
based on the obtained information, present via the display visual information identifying a first application as an application which consumes more power in a background than that consumed by a second application of the applications;
present via the display a user selectable icon permitting a user to terminate a selected application if the display is turned off; and
terminate the selected application if the display is turned off in response to a selection of the user selectable icon.

14. The portable electronic device of claim 13, wherein the control unit is further configured to present via the display visual information pertaining to background power usage for a given application of the applications.

15. A portable electronic device comprising:
a display;
a memory within which applications are stored;

a control unit, operatively coupled to the memory, and configured to:

obtain information indicative of an amount of background power usage for respective applications consuming power within the electronic device;

based on the obtained information, present via the display visual information identifying a first application as an application which consumes more power in a background than that consumed by a second application of the applications;

present via the display a menu option to enable terminating of a selected application if the display is turned off; and terminate the selected application upon the display turning off in response to a selection of the menu option.

16. The portable electronic device of claim 15, wherein the control unit is further configured to present via the display visual information pertaining to background power usage for a given application of the applications.

17. The portable electronic device of claim 15, wherein the control unit is further configured to present via the display visual information pertaining to wakeup frequency for a given application of the applications.

18. A portable electronic device comprising:
a display;
a memory within which applications are stored;
a control unit, operatively coupled to the memory, and configured to:

obtain information indicative of an amount of background power usage for respective applications consuming power within the electronic device;

based on the obtained information, present via the display visual information identifying a first application as an application which consumes more power in a background than that consumed by a second application of the applications;

present via the display a menu option for setting a corresponding application to be terminated if the display is turned off; and terminate the corresponding application upon the display turning off if the menu option is activated.

19. The portable electronic device of claim 18, wherein the control unit is further configured to present via the display visual information pertaining to background power usage for a given application of the applications.

20. The portable electronic device of claim 18, wherein the control unit is further configured to present via the display visual information pertaining to wakeup frequency for a given application of the applications.

* * * * *